July 9, 1929.  D. P. MOLONY  1,720,086
CHARGE CONTROL FOR INTERNAL COMBUSTION ENGINES
Filed Dec. 1, 1924
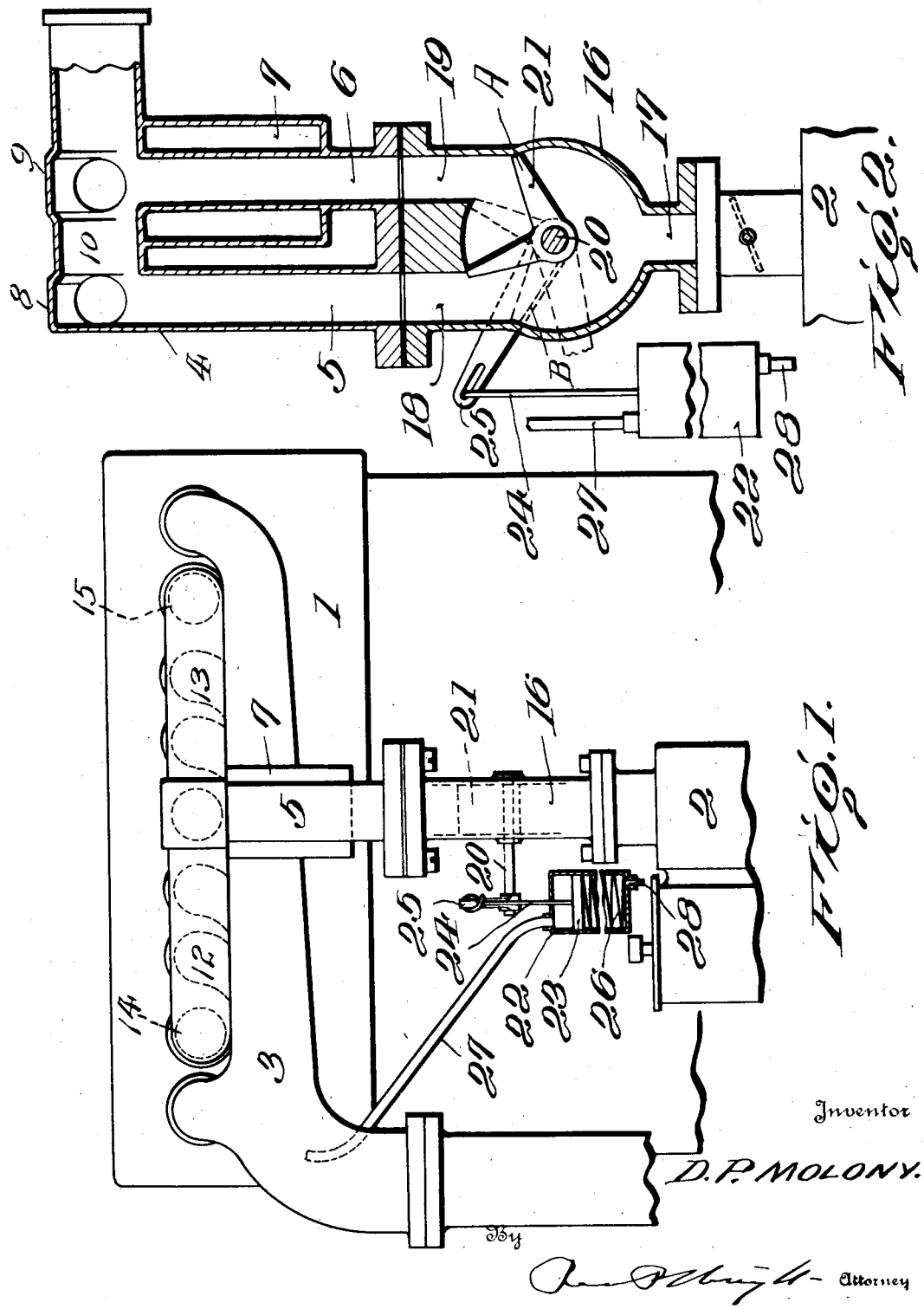
Inventor
D. P. MOLONY.
By
Attorney Patented July 9, 1929.

1,720,086

UNITED STATES PATENT OFFICE.

DONALD P. MOLONY, OF FLINT, MICHIGAN, ASSIGNOR TO MARVEL CARBURETER COMPANY, OF FLINT, MICHIGAN, A CORPORATION OF INDIANA.

CHARGE CONTROL FOR INTERNAL-COMBUSTION ENGINES.

Application filed December 1, 1924. Serial No. 753,174.

This invention relates to certain new and useful improvements in charge control for internal combustion engines and is an improvement on the construction of heat control shown in my companion application filed October 23, 1919, Serial Number 332,702, the object being to provide means for regulating the temperature of the explosive charge in its passage to the internal combustion engine according to the gas pressure existing in the exhaust line of the engine.

Another object of my invention is to provide a manifold with a primary and a secondary passage, the primary passage being a high velocity passage with a maximum charge heating means and the secondary passage being a low velocity passage without heating means whereby the explosive charge can be diverted through either of these passages so as to heat the charge at low gas pressure and to deliver the charge in an unheated condition at high gas pressure.

Other and further objects and advantages of the invention will be hereinafter set forth and the novel features thereof defined by the appended claims.

In the drawings,

Figure 1 is a side elevation of an internal combustion engine showing the application of my improved construction of charge control thereto, the pressure chamber being shown in section; and Figure 2 is a vertical section through the manifold showing the valve and its connection with the pressure chamber.

In the drawings 1 indicates an internal combustion engine and 2 a charge forming device. In the embodiment of my invention as herein shown I produce an exhaust manifold 3 and an intake manifold 4 formed as a unit, the intake manifold being provided with a low velocity passage 5 and a high velocity passage 6 having a heating chamber 7 surrounding the same in communication with the exhaust manifold so that the exhaust gases will circulate through the heating chamber in order to heat the explosive charge passing through the passage 6.

The high and low velocity passages 5 and 6 of the intake manifold are in communication at their upper end with chambers 8 and 9 connected together by a passage 10, which is extended as shown at 11 and is provided with a branch for conveying a portion of the explosive charge to the intake of the internal combustion engine. Extending outwardly from the chambers 8 and 9 are conduits 12 and 13 having branch conduits 14 and 15 and leading to the intake of the internal combustion engine and these conduits are also of different sizes.

Arranged between the charge forming device 2 and the intake manifold 4 is a valve casing 16 having an inlet passage 17 in communication with the outlet passage of the charge forming device 2 as clearly shown. The valve casing 16 is provided with outlet passages 18 and 19 registering with the high and low velocity passages 5 and 6 and corresponding in size with these passages.

Extending transversely through the valve casing 16 is a valve stem 20 having a valve 21 fixed thereon adapted to divert the explosive charge passing through the valve casing into either of the passages 18 and 19 so that when the valve is turned in the position designated by dotted lines A, the explosive charge is diverted through the outlet 18 and when the valve is in the position shown by dotted lines designated B, the explosive charge is diverted through the passage 19, which provides means for delivering to an internal combustion engine a heated explosive charge or unheated explosive charge.

In order to control the valve I provide a pressure chamber 22 in which is mounted a plunger 23 having a plunger rod 24 working through one end of the chamber, said plunger rod being loosely connected at its upper end to an arm 25 fixed to the valve stem 20 so that as the plunger rises and falls, the position of the valve will be shifted in order to control the passage of the explosive charge through the high and low velocity passages.

The plunger 23 is held in a raised position by coil spring 26 which resists the downward movement of the plunger. The top of the pressure chamber 22 is connected to the exhaust manifold 3 by a pipe 27 and the bottom of the chamber is provided with an outlet 28 to the atmosphere, whereby the amount of exhaust gas pressure existing in the exhaust line or manifold of the internal combustion engine will act on the plunger to shift the position of the valve 21.

This provides means for automatically controlling the position of the valve by the exhaust pressure so that at low throttle position, the explosive charge will pass through the high velocity passage to be heated and at high throttle position, pass through the low velocity passage in an unheated condition.

The construction of the pressure chamber and means for operating the plunger thereof are substantially the same as shown in my application filed October 23, 1919, Serial Number 332,702.

From the foregoing description it will be seen that I have provided a charge control for internal combustion engines in which a manifold is used having a heated passage and an unheated passage in connection with a valve for diverting the explosive charge in its passage to the internal combustion engine through either of these passages, said valve being automatically shifted by the exhaust pressure existing in the exhaust line of the internal combustion engine.

What I claim is:

1. The combination with an internal combustion engine having an exhaust manifold, of an intake manifold having high and low velocity passages, means for heating the high velocity passage, a valve controlling the passage of explosive fluid through said passages and means actuated by the gas pressure of said exhaust manifold for actuating said valve.

2. The combination with an internal combustion engine having an exhaust manifold, of an intake manifold having a heated and an unheated passage, means for diverting the explosive charge through either of said passages and means for actuating said means controlled by the exhaust pressure in said exhaust manifold.

3. The combination with an internal combustion engine having an exhaust line, of an intake manifold having high and low velocity passages, a charge forming device, a valve for diverting the explosive charge from said charge forming device through either of said passages and means actuated by the exhaust pressure in said exhaust line for actuating said valve.

4. The combination with an internal combustion engine having an exhaust line, of an intake manifold having high and low velocity passages, means for heating one of said passages, a charge forming device, a valve for diverting the explosive charge from said charge forming device through either of said passages and means actuated by the exhaust pressure in said exhaust line for actuating said valve.

5. The combination with an internal combustion engine, having an exhaust line, of a manifold for said engine having passages of different sizes, means for heating the smaller passage, a charge forming device, a valve for controlling the explosive charge through said passages and means actuated by the pressure in the exhaust line for actuating said valve.

6. The combination with an internal combustion engine having an exhaust line, of an intake manifold connected to said engine having a primary and a secondary intake passage, means for heating the primary passage and means for controlling the passage of explosive charge through said passages actuated by the exhaust pressure in the exhaust line.

7. The combination with an internal combustion engine having an exhaust line, of an intake manifold therefor having high and low velocity passages, means for heating the high velocity passage, a valve for controlling the passage of explosive charge through said passages, a pressure chamber in communication with said exhaust line, a plunger in said chamber and a connection between said plunger and said valve.

8. The combination with an internal combustion engine having an exhaust manifold, of an intake manifold having high and low velocity passages, means for heating the high velocity passage, a valve for diverting the explosive charge passing through said intake manifold through either of said passages, said valve having an arm connected therewith, a pressure chamber in communication with the exhaust manifold, a plunger in said pressure chamber and a plunger rod carried by said plunger having a loose connection with said arm.

In testimony whereof I hereunto affix my signature.

DONALD P. MOLONY.